United States Patent
Prasad et al.

(10) Patent No.: US 12,506,695 B2
(45) Date of Patent: Dec. 23, 2025

(54) PACKET REORDERING ENGINE

(71) Applicant: GM Cruise Holdings LLC, San Francisco, CA (US)

(72) Inventors: A N Shanthi Prasad, Cupertino, CA (US); Henry Edward Styles, Menlo Park, CA (US); Alpesh Oza, San Jose, CA (US); Reynold Leong, Foster City, CA (US); Shanmugam Somasundaram Ramanathan, San Jose, CA (US); Niranjana Parampalli, Santa Clara, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 463 days.

(21) Appl. No.: 18/149,813

(22) Filed: Jan. 4, 2023

(65) Prior Publication Data
US 2024/0223508 A1  Jul. 4, 2024

(51) Int. Cl.
*H04L 47/62* (2022.01)

(52) U.S. Cl.
CPC .................. *H04L 47/624* (2013.01)

(58) Field of Classification Search
CPC ......... H04L 47/62; H04L 47/32; H04L 47/34; H04L 49/55; H04L 49/30; H04L 49/90; H04L 69/04; H04L 69/22; H04L 12/80; H04L 12/86; H04L 12/93; H04L 1/08; H04L 1/18; G06F 3/00
USPC ...................................................... 370/412
See application file for complete search history.

(56) References Cited

U.S. PATENT DOCUMENTS

| | | | | |
|---|---|---|---|---|
| 6,735,647 B2 * | 5/2004 | Boyd | .................. | H04L 49/9094 710/52 |
| 7,349,398 B1 * | 3/2008 | Favor | .................. | H04L 49/9094 370/429 |
| 7,646,780 B2 * | 1/2010 | Shaikli | .................... | H04L 47/50 370/429 |
| 7,760,737 B2 * | 7/2010 | Rana | ....................... | H04L 47/28 370/473 |
| 9,037,810 B2 * | 5/2015 | Habusha | ................. | G06F 12/08 711/144 |
| 9,584,637 B2 * | 2/2017 | Swartzentruber | ....... | H04L 69/22 |
| 9,804,959 B2 * | 10/2017 | Mirza | .................... | G06F 12/023 |
| 9,853,920 B2 * | 12/2017 | Lawson | .............. | H04L 49/9042 |
| 11,477,138 B2 * | 10/2022 | Dutta | ...................... | H04L 45/50 |
| 11,824,799 B2 * | 11/2023 | Melman | .................. | H04L 69/22 |

(Continued)

*Primary Examiner* — Man U Phan
(74) *Attorney, Agent, or Firm* — CANTOR COLBURN LLP

(57) ABSTRACT

An apparatus is described and includes a packet reordering engine (PRE) for reordering data packets stored in a packet buffer at locations identified by buffer descriptors (BD). The PRE includes a BD fetch manager for fetching BDs associated with the stored data packets; a header decoder module for fetching the header portion for the stored data packets associated with the fetched BDs; a reorder module for receiving the fetched BDs and the fetched header portions and storing the fetched BD associated with the data packet in a slot of the reorder buffer; and a buffer processor configured to receive BDs from the reorder module in an order indicated by the header information of the data packets associate with the BDs and to fetch the payloads of the data packets with which the received BDs are associated from the packet buffer.

12 Claims, 8 Drawing Sheets

(56) References Cited

U.S. PATENT DOCUMENTS

2014/0369351 A1* 12/2014 Singh ................ H04L 12/18
 370/390
2016/0182369 A1* 6/2016 Vasudevan ............ H04L 47/115
 370/235
2019/0044879 A1* 2/2019 Richardson ........... H04L 47/624

* cited by examiner

PACKET REORDERING ENGINE

BACKGROUND

Technical Field

The present disclosure relates generally to data communications networks and, more specifically, to a packet reordering engine for use in data communications networks.

Introduction

In computer networking, out-of-order delivery refers to the receipt of data packets at a receiver node in a different order than they were sent by a sender node. Out-of-order delivery can result from a variety of causes, such as packets taking different paths through the network from the sender node to the receiver node, lower level retransmission procedures, and parallel processing paths within network equipment that are not designed to ensure that ordering is preserved, for example.

One approach to correcting out-of-order delivery is to write the payload of each received packet to an on-chip RAM at a location corresponding to the sequence number of the packet, such that the sequence number addresses the location of the payload in the RAM. The payload can then be read out of the RAM in the intended order. This approach requires the on-chip RAM to be large enough to store the payload of all of the packets being processed.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
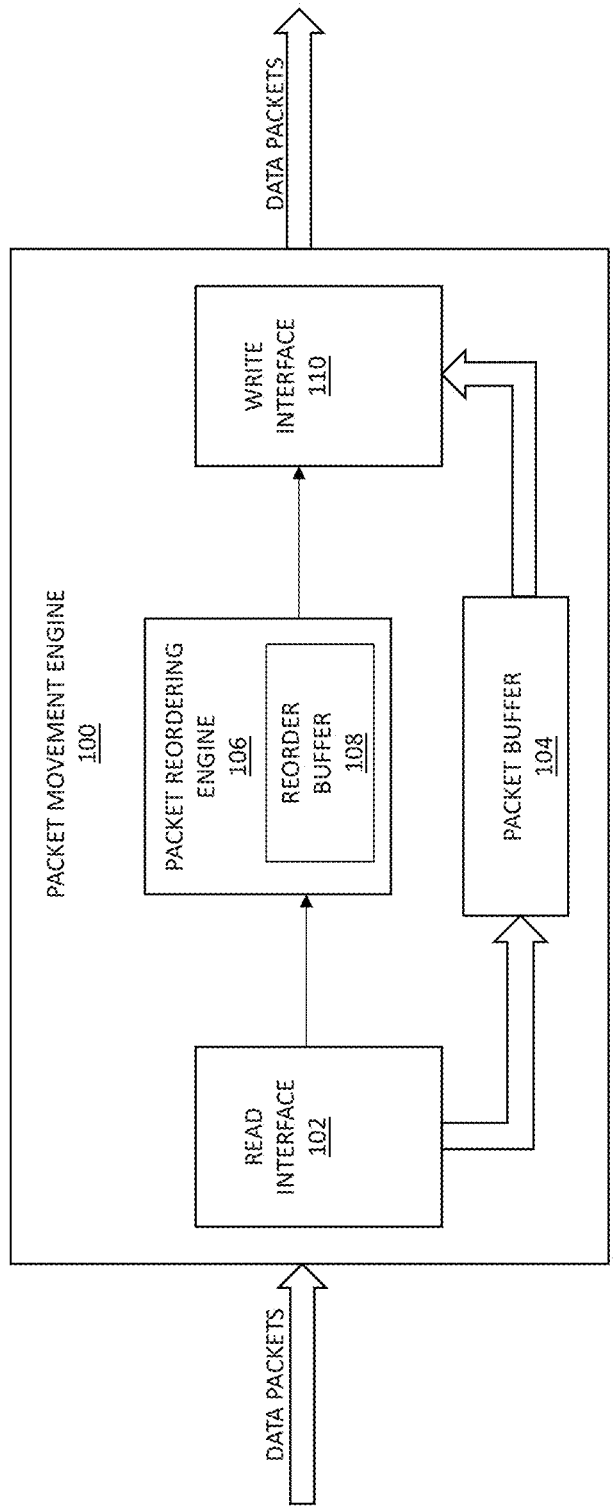
FIG. 1 illustrates a schematic block diagram showing a data packet movement engine including a packet reordering engine, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

As will be described in greater detail hereinbelow, a packet reordering engine of some embodiments implements a two-step method for correcting for out-of-order delivery in which an order of magnitude less on-chip RAM may be used than required by conventional techniques, such as described above. In a first step, a packet buffer address (or "buffer descriptor") of the data packet in dynamic random access memory (DRAM) is written into an on-chip RAM using the sequence number of the data packet as the location in on-chip RAM for the packet buffer address. In this step, the data packet payload remains in the packet buffer (DRAM). In a second step, packet buffer addresses are read from on-chip RAM in order and the corresponding payloads are fetched from DRAM. Because the size of the packet buffer address is an order of magnitude smaller than the size of the packet payload (e.g., on the order of 5-8 bytes vs. on the order of 8 kilobytes), a smaller on-chip RAM may be used to implement the technique described herein.

Example Embodiments

FIG. 1 illustrates a schematic block diagram of a data packet movement engine (DPME) 100 in accordance with features of embodiments described herein. As shown in FIG. 1, DPME 100 includes a read interface 102 for receiving data packets into the DPME 100 and storing them in a packet buffer 104. Upon receipt of one or more data packets, read interface 102 may notify packet reordering engine 106 that new data packet(s) have been written to packet buffer 104 to enable packet reordering engine 106 to reorder the packets using reorder buffer 108 as will be described in greater detail below. Once the packets are reordered, the payloads of the data packets may be fetched from the packet buffer by a write interface 110 for further processing externally to the DPME 100. DPME 100 may be implemented in any number of types of different systems for reordering data packets received over a data communications network and details of the particular embodiments of DPME described herein are provided for purposes of example and illustration only.

Figure 2:
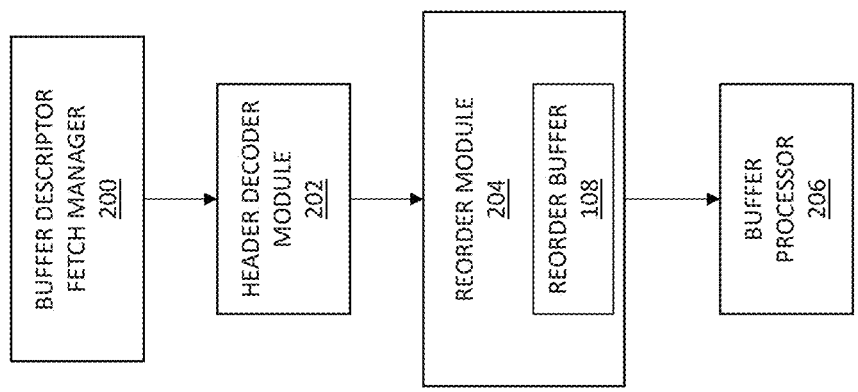
FIG. 2 illustrates a schematic block diagram showing additional details of the packet reordering engine of FIG. 1, according to some examples of the present disclosure.

FIG. 2 illustrates a schematic block diagram of packet reordering engine 106 in accordance with features of embodiments described herein. As shown in FIG. 2, packet reordering engine 106 include a buffer descriptor fetch manager 200, a header decoder module 202, a reorder module 204, and a buffer processor 206.

In particular embodiments, buffer descriptor fetch manager 200 waits for a notification from read interface 102 that data packets have been written to packet buffer 104. Buffer descriptor fetch manager 200 fetches the buffer descriptors (which correspond to locations in packet buffer 104) for data packets stored in the packet buffer 104 and passes them to header decoder module 202 for further processing.

In particular embodiments, header decoder module 202 fetches header information for buffer packets stored at the buffer descriptors provided to header decoder module 202 by buffer descriptor fetch manager 200 and provides the buffer descriptors and header information to reorder module 204 as header decode requests for processing. In particular, header information fetched from packet buffer include a sequence number for the packet, which sequence number indicates a relative location of the packet in an ordered sequence of packets. It will be recognized that, in accordance with aspects of embodiments described herein, the payload portions of the data packets are not retrieved from the packet buffer 104 along with the header information; rather, the payload portions remain in the packet buffer in the locations indicated by the buffer descriptors fetched by the buffer descriptor fetch manager 200.

In particular embodiments, reorder module 204 reorders header decode requests based on the sequence number and stores the requests (or portions of the requests) in slots in reorder buffer 108. In particular embodiments, up to 32 header decode requests may be reordered at a time. In alternative embodiments, more or fewer header decode requests may be accommodated by the reorder buffer 108. The reorder module 204 may be implemented using a sliding window into multiple header decode requests. In the example embodiment described herein, the window may span the previous 32 requests. In one embodiment (as illustrated in FIG. 3B), as header decode requests arrive, they are written to reorder buffer 108 at the first available slot and the slot is marked as used and is unavailable for writing until it is released by the occurrence of a read from the slot. Once all slots of reorder buffer 108 are filled, reorder module 204 may backpressure header decoder module 202 until a slot is empty and available to accommodate another header decode request.

In one example implementation, reorder module 204 scans reorder buffer 108 to retrieve the next valid entry to send to buffer processor 206. In a particular embodiment, reorder module 204 maintains the next valid sequence number to be processed and scans reorder buffer 108 looking for a request that has a sequence number closest to the maintained value. Reorder module 204 computes a distance between the sequence number closest to the maintained value and the maintained value. If the distance is 0 (i.e., if the values match), the sequence number corresponds to the expected entry and the entry is sent from reorder buffer 108 to buffer processor 206 for further processing. The maintained value is then incremented to the next sequence number. If the distance between the compared values is negative, the entry is sent from reorder buffer 108 to buffer processor 206 but is flushed instead of processed. Flushing of the entry may result in other operations outside the scope of this description. If the distance between the compared values is positive, a countdown timer may be started. When the countdown timer expires, entries in reorder buffer 108 may once again be scanned and if the matching sequence number is not found, a missing packet error may be raised. Processing of a missing packet may involve a variety of actions that are outside the scope of this description.

Figure 3A:
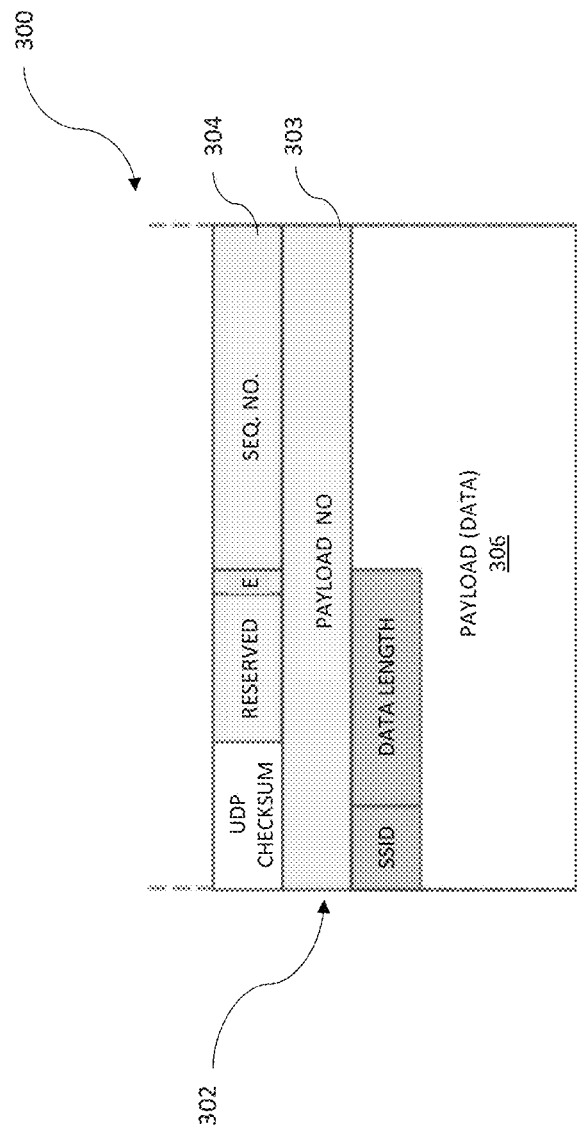
FIG. 3A illustrates a schematic block diagram showing a data packet that may be processed by the data packet movement engine of FIG. 1, according to some examples of the present disclosure.
Figure 3B:
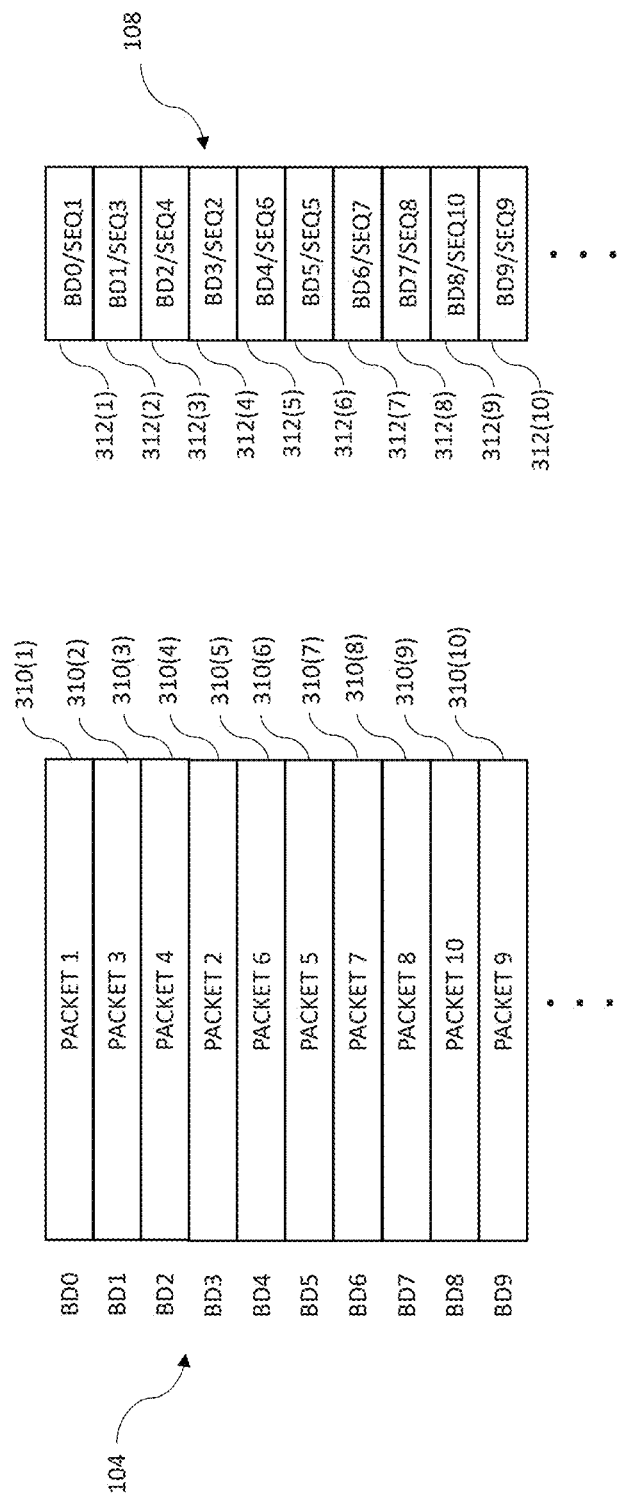
FIGS. 3B and 3C illustrate schematic block diagrams showing additional details of the packet buffer and the reordering buffer of FIG. 1, according to some embodiments of the present disclosure.
Figure 3C:
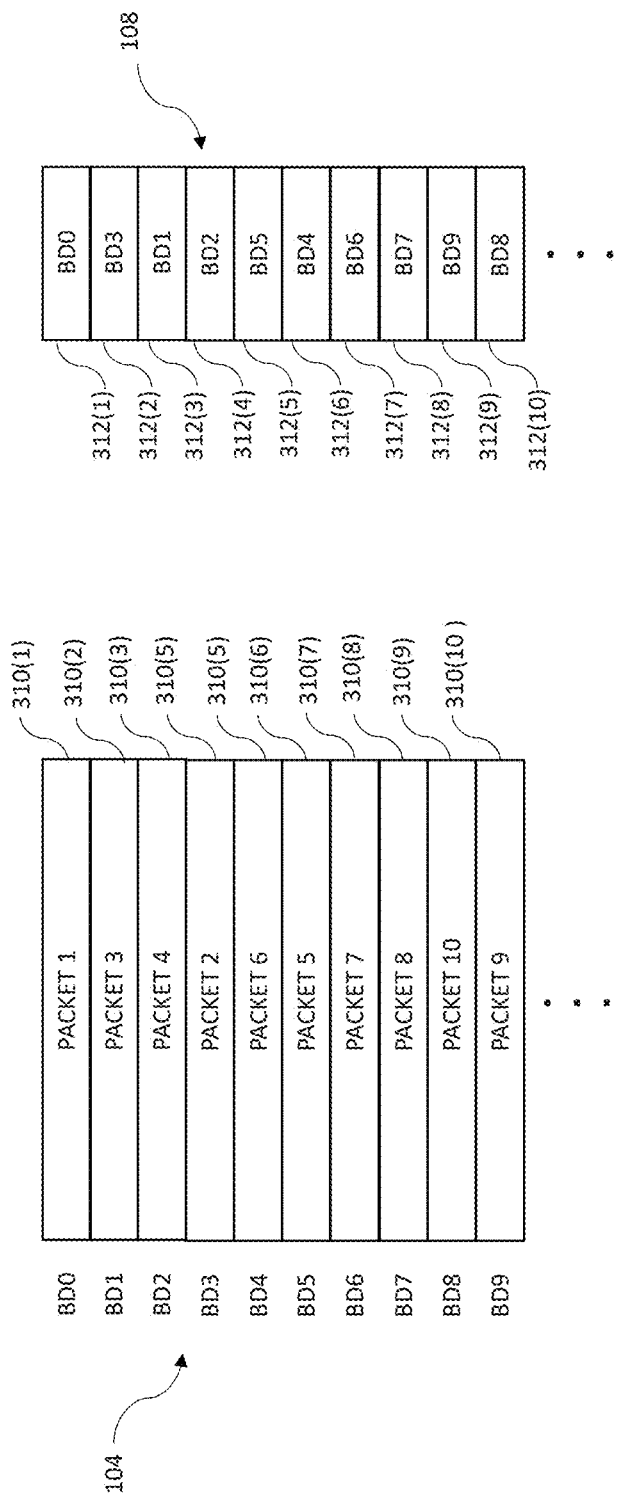

In another example operation (as illustrated in FIG. 3C), as header decode requests arrive, the buffer descriptors may be placed in slots in reorder buffer 108 in order based on the corresponding sequence number, such that the buffer descriptor for the packet having the first sequence number of the window is placed in the first slot, the buffer descriptor for the packet having the second sequence number is placed in the second slot of reorder buffer, and so on. In this case, buffer descriptors may be read out of reorder buffer 108 to buffer processor 206 in order from first slot to final slot.

Buffer processor 206 uses the buffer descriptor information received from reorder module 204 to fetch the corresponding payload from packet buffer 104 and provide it to write interface 110 for transfer and/or further processing. It will be noted that, until fetched by buffer processor 206, the payload remains within packet buffer 104 and is never written to reorder buffer 108.

FIG. 3A illustrates a schematic block diagram of an example format of a data packet 300 that may be processed by the DPME 100 (FIG. 1), according to some examples of the present disclosure. As shown in FIG. 3A, the data packet 300 includes a header portion 302 including a PAYLOAD NO field 303 containing a payload number identifying the payload to which the packet 300 belongs, a SEQ NO field 304 containing a sequence number identifying an order of the packet within the payload identified in the payload number field 303, and a PAYLOAD (DATA) field 306 containing the payload, or data, of the packet 302. In particular, a payload may include N packets. All N packets within the payload will have the same payload number; the sequence numbers of the packets identify the order of the packets within the payload. Accordingly, a combination of the payload number in the PAYLOAD NO field 303 and the sequence number in the SEQ NO field 304 may be used to identify the overall order of the packets.

FIG. 3B illustrates a schematic block diagram showing additional details of an example operation of the packet buffer 104 and the reordering buffer 108, according to some embodiments of the present disclosure. In particular, FIG. 3B illustrates an embodiment in which buffer descriptors (BDs) and sequence numbers (SEQ) for packets stored in slots 310(1)-310(10) of packet buffer 104 are written to slots 312(1)-312(10) of reorder buffer 108 in the order in which they are received by packet reordering engine 106. For example, as illustrated in FIG. 3B, BD and SEQ for the packet stored in slot 310(1) (i.e., BD0, SEQ1) are written to slot 312(1). Similarly, BD and SEQ for the packet stored in slot 310(1) (i.e., BD1, SEQ3) are written to slot 312(1), and so on through BD and SEQ for the packet stored in slot 310(10) (i.e., BD9, SEQ9) are written to slot 312(10).

FIG. 3C illustrates a schematic block diagram showing additional details of an example operation of the packet buffer 104 and the reordering buffer 108, according to some embodiments of the present disclosure. In particular, FIG. 3C illustrates an embodiment in which BDs (and possibly sequence numbers (SEQ) and/or other header information) for packets stored in slots 310(1)-310(10) of packet buffer 104 are written to slots 312(1)-312(10) of reorder buffer 108 in the order of packet sequence number. For example, as illustrated in FIG. 3C, BD for the packet stored in slot 310(1) (i.e., BD0) is written to slot 312(1), which corresponds to the sequence number (SEQ1) of the packet. Similarly, BD for the packet stored in slot 310(2) (i.e., BD1) is written to slot 312(3), which corresponds to the sequence number (SEQ3) of the packet. BD for the packet stored in slot 310(3) (i.e., BD2) is written to slot 312(4), which corresponds to the sequence number (SEQ4) of the packet, and so on through BD for the packet stored in slot 310(10) (i.e., BD 9), which is written to slot 312(9).

Figure 4:
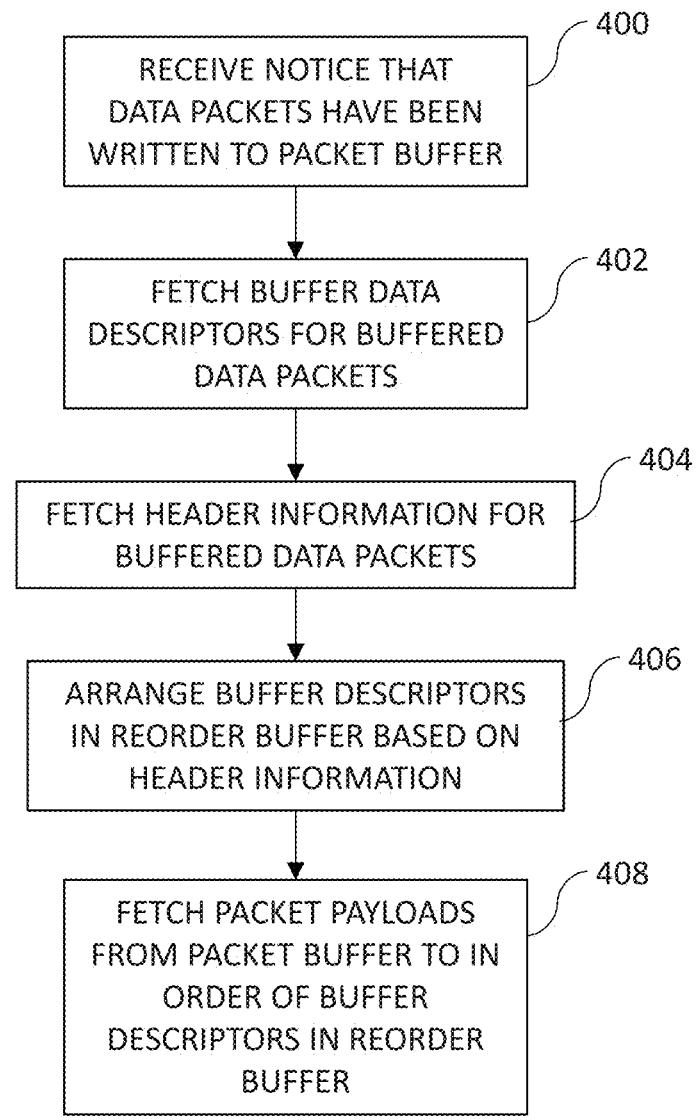
FIG. 4 is a flow chart illustrating example operation of the packet reordering engine of FIG. 1, according to some examples of the present disclosure.

FIG. 4 is a flow chart illustrating example operation of the packet reordering engine 106 (FIG. 1), according to some examples of the present disclosure.

In operation 400, packet reordering engine receives a notification (e.g., from read interface 102 (FIG. 1)) that data packets have been written to packet buffer (e.g., packet buffer 104 (FIG. 1)) and are ready for processing by packet reordering engine. In particular embodiments, data packets (e.g., in the format of data packet 300 (FIG. 3A)) are written to slots in packet buffer in the order in which they are received at DPME (e.g., DPME 100 (FIG. 1)) and therefore may require reordering before they are able to be further processed by another node.

In operation 402, BDs for data packets buffered in slots of the packet buffer are fetched. In certain embodiments, the BDs are fetched in sequential order.

In operation 404, header information (e.g., sequence number) is fetched for each of the data packets buffered in slots of the packet buffer. In certain embodiments, the BD and header information are combined to form a header decode request for the packet.

In operation 406, all or a portion of the information comprising the header decode requests are stored in slots of the reorder buffer (e.g., reorder buffer 108 (FIG. 1)). Operation 406 may be performed, for example, using the operations described with reference to one of FIGS. 3B and 3C.

In operation 408, data packet payloads are fetched directly from the packet buffer in the order defined by the packet sequence numbers using the BDs information in the reorder buffer. As previously mentioned, and in accordance with embodiments described herein, at no point is any portion of packet payloads stored in the reorder buffer; the payloads are stored in the packet buffer until retrieved for processing (e.g., by another network node).

It will be recognized that in particular embodiments, reordering may be performed using the combination of the payload number and the sequence number for the packets, with both the payload number and the sequence number used to determine the write into and reorder buffer in the manner described above.

In particular embodiments, buffer processor 206 is capable of processing multi-substream packets. Referring again to FIG. 3A, which illustrates an example packet structure, there may be defined a tuple comprising fields {SSID, DATA LENGTH, PAYLOAD}. This tuple can repeat with different values for fields. Each SSID indicates a different destination descriptor for the following PAYLOAD of length DATA LENGTH. Up to eight substreams can be supported. The buffer processor 206, like the BDs fetch manager 200 and the header decode module 202, fetches only fields {SSID, DATA LENGTH] and creates an array of transfer request. No payloads are fetched. The transfers are then executed in order with payload fetch request to write interface 110.

Example AV Management System

Figure 5:
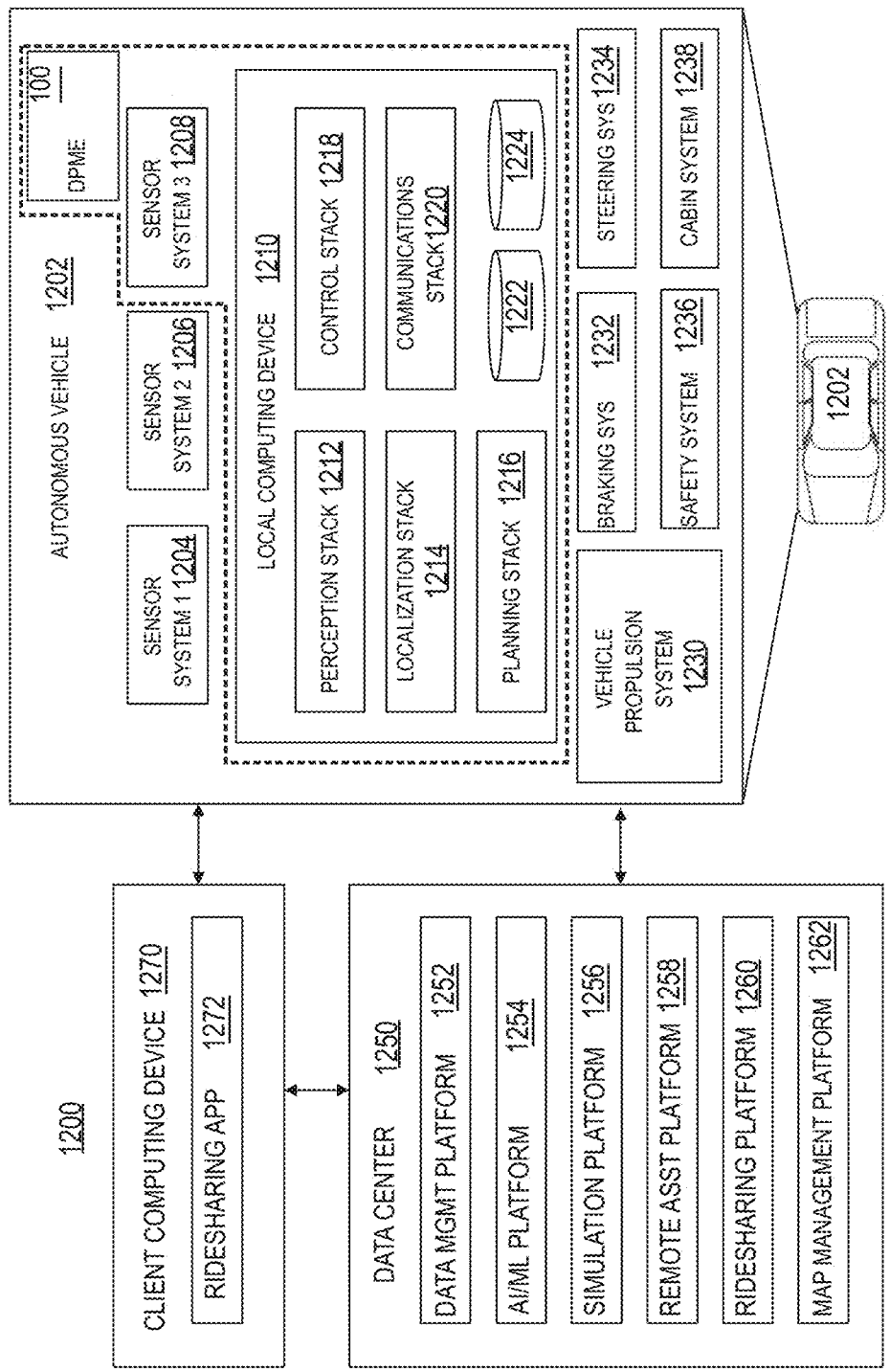
FIG. 5 illustrates an example system environment that can be used to facilitate autonomous vehicle (AV) dispatch and operations and in which the data packet movement engine of FIG. 1 may be deployed, according to some examples of the present disclosure.

Turning now to FIG. 5, illustrated therein is an example of an AV management system 1200. One of ordinary skill in the art will understand that, for the AV management system 1200 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 1200 includes an AV 1202, a data center 1250, and a client computing device 1270. The AV 1202, the data center 1250, and the client computing device 1270 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 1202 can navigate about roadways without a human driver based on sensor signals generated by multiple sensor systems 1204, 1206, and 1208. The sensor systems 1204-1208 can include different types of sensors and can be arranged about the AV 1202. For instance, the sensor systems 1204-1208 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1204 can be a camera system, the sensor system 1206 can be a LIDAR system, and the sensor system 1208 can be a RADAR system. Other examples may include any other number and type of sensors.

AV 1202 can also include several mechanical systems that can be used to maneuver or operate AV 1202. For instance, the mechanical systems can include vehicle propulsion system 1230, braking system 1232, steering system 1234, safety system 1236, and cabin system 1238, among other systems. Vehicle propulsion system 1230 can include an electric motor, an internal combustion engine, or both. The braking system 1232 can include an engine brake, a wheel braking system (e.g., a disc braking system that utilizes brake pads), hydraulics, actuators, and/or any other suitable componentry configured to assist in decelerating AV 1202. The steering system 1234 can include suitable componentry configured to control the direction of movement of the AV 1202 during navigation. Safety system 1236 can include lights and signal indicators, a parking brake, airbags, and so forth. The cabin system 1238 can include cabin temperature control systems, in-cabin entertainment systems, and so forth. In some examples, the AV 1202 may not include human driver actuators (e.g., steering wheel, handbrake, foot brake pedal, foot accelerator pedal, turn signal lever, window wipers, etc.) for controlling the AV 1202. Instead, the cabin system 1238 can include one or more client interfaces (e.g., Graphical User Interfaces (GUIs), Voice User Interfaces (VUIs), etc.) for controlling certain aspects of the mechanical systems 1230-1238.

AV 1202 can additionally include a local computing device 1210 that is in communication with the sensor systems 1204-1208, the mechanical systems 1230-1238, the data center 1250, and the client computing device 1270, among other systems. The local computing device 1210 can include one or more processors and memory, including instructions that can be executed by the one or more processors. The instructions can make up one or more software stacks or components responsible for controlling the AV 1202; communicating with the data center 1250, the client computing device 1270, and other systems; receiving inputs from riders, passengers, and other entities within the AV's environment; logging metrics collected by the sensor systems 1204-1208; and so forth. In this example, the local computing device 1210 includes a perception stack 1212, a mapping and localization stack 1214, a planning stack 1216, a control stack 1218, a communications stack 1220, a High Definition (HD) geospatial database 1222, and an AV operational database 1224, among other stacks and systems.

Perception stack 1212 can enable the AV 1202 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1204-1208, the mapping and localization stack 1214, the HD geospatial database 1222, other components of the AV, and other data sources (e.g., the data center 1250, the client computing device 1270, third-party data sources, etc.). The perception stack 1212 can detect and classify objects and determine their current and predicted locations, speeds, directions, and the like. In addition, the perception stack 1212 can determine the free space around the AV 1202 (e.g., to maintain a safe distance from other objects, change lanes, park the AV, etc.). The perception stack 1212 can also identify environmental uncertainties, such as where to look for moving objects, flag areas that may be obscured or blocked from view, and so forth.

Mapping and localization stack 1214 can determine the AV's position and orientation (pose) using different methods from multiple systems (e.g., GPS, IMUs, cameras, LIDAR, RADAR, ultrasonic sensors, the HD geospatial database 1222, etc.). For example, in some examples, the AV 1202 can compare sensor data captured in real-time by the sensor systems 1204-1208 to data in the HD geospatial database 1222 to determine its precise (e.g., accurate to the order of a few centimeters or less) position and orientation. The AV 1202 can focus its search based on sensor data from one or more first sensor systems 1204 (e.g., GPS) by matching sensor data from one or more second sensor systems 1206 (e.g., LIDAR). If the mapping and localization information from one system is unavailable, the AV 1202 can use mapping and localization information from a redundant system and/or from remote data sources.

The planning stack 1216 can determine how to maneuver or operate the AV 1202 safely and efficiently in its environment. For example, the planning stack 1216 can receive the location, speed, and direction of the AV 1202, geospatial data, data regarding objects sharing the road with the AV 1202 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1202 from one point to another. The planning stack 1216 can determine multiple sets of one or more mechanical operations that the AV 1202 can perform (e.g., go straight at a specified speed or rate of acceleration, including maintaining the same speed or decelerating; power on the left blinker, decelerate if the AV is above a threshold range for turning, and turn left; power on the right blinker, accelerate if the AV is stopped or below the threshold range for turning, and turn right; decelerate until completely stopped and reverse; etc.), and select the best one to meet changing road conditions and events. If something unexpected happens, the planning stack 1216 can select from multiple backup plans to carry out. For example, while preparing to change lanes to turn right at an intersection, another vehicle may aggressively cut into the destination lane, making the lane change unsafe. The planning stack 1216 could have already determined an alternative plan for such an event, and upon its occurrence, help to direct the AV 1202 to go around the block instead of blocking a current lane while waiting for an opening to change lanes.

The control stack 1218 can manage the operation of the vehicle propulsion system 1230, the braking system 1232, the steering system 1234, the safety system 1236, and the cabin system 1238. The control stack 1218 can receive sensor signals from the sensor systems 1204-1208 as well as communicate with other stacks or components of the local computing device 1210 or a remote system (e.g., the data center 1250) to effectuate operation of the AV 1202. For example, the control stack 1218 can implement the final path or actions from the multiple paths or actions provided by the planning stack 1216. This can involve turning the routes and decisions from the planning stack 1216 into commands for the actuators that control the AV's steering, throttle, brake, and drive unit.

The communication stack 1220 can transmit and receive signals between the various stacks and other components of the AV 1202 and between the AV 1202, the data center 1250, the client computing device 1270, and other remote systems. The communication stack 1220 can enable the local computing device 1210 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 1222 can store HD maps and related data of the streets upon which the AV 1202 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 1224 can store raw AV data generated by the sensor systems 1204-1208 and other components of the AV 1202 and/or data received by the AV 1202 from remote systems (e.g., the data center 1250, the client computing device 1270, etc.). In some examples, the raw AV data can include HD LIDAR point cloud data, image or video data, RADAR data, GPS data, and other sensor data that the data center 450 can use for creating or updating AV geospatial data.

The data center 1250 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1250 can include one or more computing devices remote to the local computing device 1210 for managing a fleet of AVs and AV-related services. For example, in addition to managing the AV 1202, the data center 450 may also support a ridesharing service, a delivery service, a remote/roadside assistance service, street services (e.g., street mapping, street patrol, street cleaning, street metering, parking reservation, etc.), and the like.

The data center 1250 can send and receive various signals to and from the AV 1202 and the client computing device 1270. These signals can include sensor data captured by the sensor systems 1204-1208, roadside assistance requests, software updates, ridesharing pick-up and drop-off instructions, and so forth. In this example, the data center 1250 includes one or more of a data management platform 1252, an Artificial Intelligence/Machine Learning (AI/ML) platform 1254, a simulation platform 1256, a remote assistance platform 1258, a ridesharing platform 1260, and a map management platform 1262, among other systems.

Data management platform 1252 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1250 can access data stored by the data management platform 1252 to provide their respective services.

The AI/ML platform 1254 can provide the infrastructure for training and evaluating machine learning algorithms for operating the AV 1202, the simulation platform 1256, the remote assistance platform 1258, the ridesharing platform 1260, the map management platform 1262, and other platforms and systems. Using the AI/ML platform 1254, data scientists can prepare data sets from the data management platform 1252; select, design, and train machine learning models; evaluate, refine, and deploy the models; maintain, monitor, and retrain the models; and so on.

The simulation platform 1256 can enable testing and validation of the algorithms, machine learning models, neural networks, and other development efforts for the AV 1202, the remote assistance platform 1258, the ridesharing platform 1260, the map management platform 1262, and other platforms and systems. The simulation platform 1256 can replicate a variety of driving environments and/or reproduce real-world scenarios from data captured by the AV 1202, including rendering geospatial information and road infrastructure (e.g., streets, lanes, crosswalks, traffic lights, stop signs, etc.) obtained from the map management platform 1262; modeling the behavior of other vehicles, bicycles, pedestrians, and other dynamic elements; simulating inclement weather conditions, different traffic scenarios; and so on.

The remote assistance platform 1258 can generate and transmit instructions regarding the operation of the AV 1202. For example, in response to an output of the AI/ML platform 1254 or other system of the data center 1250, the remote assistance platform 1258 can prepare instructions for one or more stacks or other components of the AV 1202.

The ridesharing platform 1260 can interact with a customer of a ridesharing service via a ridesharing application 1272 executing on the client computing device 470. The client computing device 1270 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 1272. The client computing device 1270 can be a customer's mobile computing device or a computing device integrated with the AV 1202 (e.g., the local computing device 1210). The ridesharing platform 1260 can receive requests to be picked up or dropped off from the ridesharing application 1272 and dispatch the AV 1202 for the trip.

Map management platform 1262 can provide a set of tools for the manipulation and management of geographic and spatial (geospatial) and related attribute data. The data management platform 1252 can receive LIDAR point cloud data, image data (e.g., still image, video, etc.), RADAR data, GPS data, and other sensor data (e.g., raw data) from one or more AVs 1202, Unmanned Aerial Vehicles (UAVs), satellites, third-party mapping services, and other sources of geospatially referenced data. The raw data can be processed, and map management platform 1262 can render base representations (e.g., tiles (2D), bounding volumes (3D), etc.) of the AV geospatial data to enable users to view, query, label, edit, and otherwise interact with the data. Map management platform 1262 can manage workflows and tasks for operating on the AV geospatial data. Map management platform 1262 can control access to the AV geospatial data, including granting or limiting access to the AV geospatial data based on user-based, role-based, group-based, task-based, and other attribute-based access control mechanisms. Map management platform 1262 can provide version control for the AV geospatial data, such as to track specific changes that (human or machine) map editors have made to the data and to revert changes when necessary. Map management platform 1262 can administer release management of the AV geospatial data, including distributing suitable iterations of the data to different users, computing devices, AVs, and other consumers of HD maps. Map management platform 1262 can provide analytics regarding the AV geospatial data and related data, such as to generate insights relating to the throughput and quality of mapping tasks.

In some examples, the map viewing services of map management platform 1262 can be modularized and deployed as part of one or more of the platforms and systems of the data center 1250. For example, the AI/ML platform 1254 may incorporate the map viewing services for visualizing the effectiveness of various object detection or object classification models, the simulation platform 1256 may incorporate the map viewing services for recreating and visualizing certain driving scenarios, the remote assistance platform 1258 may incorporate the map viewing services for replaying traffic incidents to facilitate and coordinate aid, the ridesharing platform 1260 may incorporate the map viewing services into the client application 1272 to enable passengers to view the AV 1202 in transit en route to a pick-up or drop-off location, and so on.

In many examples, an application specific integrated circuit (ASIC) package may be another portion of AV 1202. Other parts of ASIC package 100 may be comprised appropriately in various components and blocks of the figure.

Example AV

Figure 6:
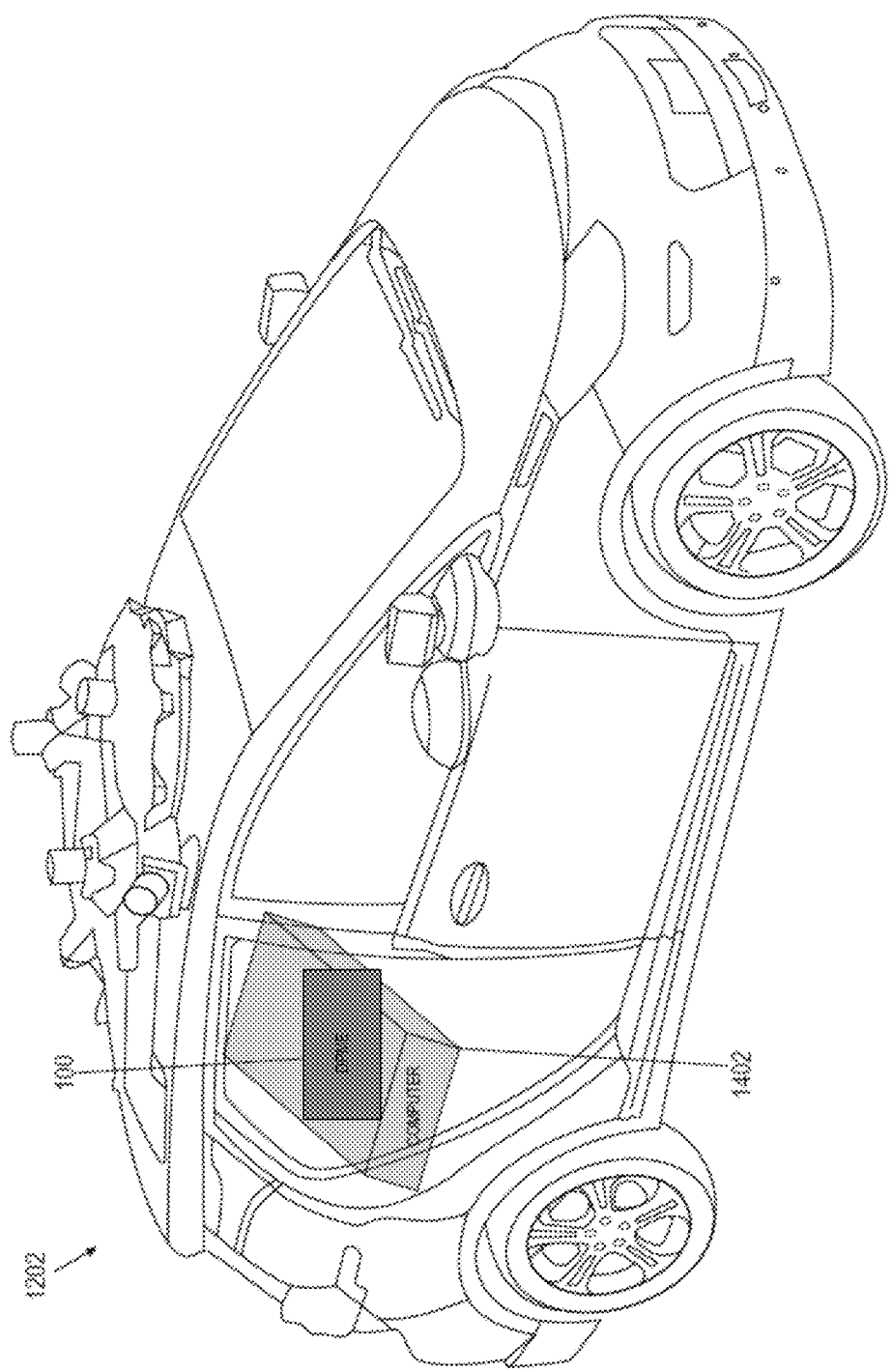
FIG. 6 is a schematic representation of an AV with an example system in which the data packet movement engine of FIG. 1 may be deployed, according to some examples of the present disclosure, according to some examples of the present disclosure.

FIG. 6 is a schematic representation of an AV 1202 with example ASIC package 100, according to some examples of the present disclosure. Although AV 1202 is shown as a sedan, any suitable type of vehicle may be used with ASIC package 100 within the scope of the present disclosure. In various examples, one or more ASIC packages as described in reference to FIG. 1 may be included within AV management system 1200 and/or computing system 1300 as described in reference to FIGS. 5 and 6. ASIC packages may include any suitable components that perform any or some of the functionalities as described in FIGS. 5 and 6. For example, one or more ASIC packages may comprise local computing device 1210. In another example, one or more ASIC packages may comprise part of control stack 1218.

In some examples, one or more functionalities of AV management system 1200 may be comprised in an on-board computer 1402. In various examples, computer 1402 may be an Automated Driving System Computer (ADSC). In such examples, one or more IC devices may include a microprocessor and/or other semiconductor IC devices of the ADSC. In many examples, given its size, computer 1402 may be installed in a trunk of AV 1202 or toward a rear of AV 1202, although it will be recognized that the features of examples described herein may be advantageously deployed in systems in which computer 1402 is enclosed in another area of AV 1202. Computer 1402 may be removably attached to the chassis of AV 1202 and/or otherwise coupled to other systems of AV 1202 by any number of wireless or wired communication pathways. In many examples, computer 1402 is configured to connect to various sensors of AV 1202 and store large amounts of vehicle camera and sensor data in different kinds of storage devices, including solid-state data storage devices.

SELECTED EXAMPLES

Example 1 provides a packet reordering engine (PRE) for reordering data packets stored in a packet buffer, in which each of the data packets includes a header portion and a payload, and in which each of the stored data packets has associated therewith a BD identifying a location of the data packet in the packet buffer, the PRE including a BD fetch manager configured to fetch the BDs associated with the data packets stored in the packet buffer; a header decoder module configured to fetch the header portion for the stored data packets associated with the fetched BDs; a reorder module including a reorder buffer, the reorder module configured to receive the fetched BDs and the fetched header portions and, for each of the data packets stored in the packet buffer, store the fetched BD associated with the data packet in a slot of the reorder buffer; and a buffer processor configured to receive BDs from the reorder module in an order indicated by the header portions of the data packets associate with the BDs and to fetch the payloads of the data packets with which the received BDs are associated from the packet buffer.

Example 2 provides the PRE of example 1, in which the header portion includes at least one of a payload number and a sequence number of the data packet.

Example 3 provides the PRE of example 2, in which the BDs are written to the slots of the reorder buffer in an order indicated by at least one of the payload number and the sequence number of the corresponding data packet.

Example 4 provides the PRE of example 2, in which the BDs are read from the slots of the reorder buffer in an order indicated by at least one of the payload number and the sequence number of the corresponding data packet.

Example 5 provides the PRE of example 3, in which the reorder module is further configured to, for each of the data packets stored in the packet buffer, store the fetched header portion associated with the data packet in the slot of the reorder buffer in which the associated BD is stored.

Example 6 provides the PRE of any of examples 1-5, in which the payloads are not stored in the reorder buffer.

Example 7 provides the PRE of any of examples 1-6, in which the packet buffer is approximately an order of magnitude larger than the reorder buffer.

Example 8 provides a DPME for processing data packets received from a data communications network node, in which each of the data packets includes a header portion and a payload portion, the DPME including a network interface module for receiving the data packets and storing each of the data packets in a slot of a packet buffer identified by a BD; a packet reorder engine configured to, for each of the data packets stored in the packet buffer, fetch the BD identifying the slot in which the data packet is stored, fetch only the header portion of the data packet, and store the BD in a packet reorder buffer; in which the BDs are read from the reorder buffer in an order indicated by the header information of the data packets associated with the BDs; and in which for each BD read from the reorder buffer, the payload portion of the data packet with which the BD is associated is fetched from the packet buffer.

Example 9 provides the DPME of example 8, in which the header portion includes a sequence number of the data packet.

Example 10 provides the DPME of example 9, in which the BDs are written to the slots of the reorder buffer in an order indicated by the sequence number of the corresponding data packet.

Example 11 provides the DPME of example 9, in which the BDs are read from the slots of the reorder buffer in an order indicated by the sequence number of the corresponding data packet.

Example 12 provides the DPME of example 11, in which the packet reorder engine is further configured to, for each of the data packets stored in the packet buffer, store the fetched header portion associated with the data packet in the slot of the reorder buffer in which the associated BD is stored.

Example 13 provides the DPME of any of examples 8-12, in which the payloads are not stored in the reorder buffer.

Example 14 provides the DPME of any of examples 8-13, in which the packet buffer is approximately an order of magnitude larger than the reorder buffer.

Example 15 provides a method of reordering data packets stored in a packet buffer, in which each of the data packets includes a header portion and a payload, and in which each of the stored data packets has associated therewith a BD identifying a location of the data packet in the packet buffer, the method including, for each of the stored data packets, fetching the BD associated with the stored data packet and only the header portion of the stored data packet and storing the fetched BD associated with the stored data packet in a slot of a reorder buffer; reading the stored BDs from the reorder buffer in an order indicated by the header portions of the stored data packets with which the BDs are associated; and for each of the stored BDs read from the reorder buffer, fetching the payload of the stored data packet with which the BD is associated from packet buffer.

Example 16 provides the method of example 15, in which the header portion includes a sequence number of the data packet.

Example 17 provides the method of example 16, in which the BDs are stored in the reorder buffer in an order indicated by the sequence number of the corresponding data packet.

Example 18 provides the method of example 16, in which the BDs are read from the reorder buffer in an order indicated by the sequence number of the corresponding data packet.

Example 19 provides the method of any of examples 15-18, further including, for each of the stored data packets, storing the fetched header portion associated with the data packet in the reorder buffer with the associated BD.

Example 20 provides the method of any of examples 15-18, further including refraining from storing the payloads in the reorder buffer.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A packet reordering engine (PRE) for reordering data packets stored in a packet buffer, wherein each of the data packets comprises a header portion and a payload, and wherein each of the stored data packets has associated therewith a buffer descriptor (BD) identifying a location of the data packet in the packet buffer, the PRE comprising:
   a BD fetch manager that fetches the BDs associated with the data packets stored in the packet buffer;
   a header decoder module that fetches the header portion for the stored data packets associated with the fetched BDs;
   a reorder module including a reorder buffer, the reorder module configured to:
      receiving the fetched BDs and the fetched header portions; and
      for each of the data packets stored in the packet buffer, storing the fetched BD associated with the data packet in a slot of the reorder buffer; and
   a buffer processor that receives BDs from the reorder module in an order indicated by the header portions of the data packets associate with the BDs and to fetch the payloads of the data packets with which the received BDs are associated from the packet buffer,
   wherein the fetched BDs are written to or read from the slots of the reorder buffer in an order indicated by at least one of a payload number and a sequence number of a corresponding data packet.

2. The PRE of claim 1, wherein the header portion comprises the at least one of the payload number and the sequence number of the corresponding data packet.

3. The PRE of claim 1, wherein the reorder module further, for each of the data packets stored in the packet buffer, stores the fetched header portion associated with the data packet in the slot of the reorder buffer in which the associated BD is stored.

4. The PRE of claim 1, wherein the payloads are not stored in the reorder buffer.

5. The PRE of claim 1, wherein the packet buffer is approximately an order of magnitude larger than the reorder buffer.

6. A data packet movement engine (DPME) for processing data packets received from a data communications network node, wherein each of the data packets comprises a header portion and a payload portion, the DPME comprising:
   a network interface module for receiving the data packets and storing each of the data packets in a slot of a packet buffer identified by a buffer descriptor (BD); and
   a packet reorder engine, for each of the data packets stored in the packet buffer:
      fetches the BD identifying the slot in which the data packet is stored;
      fetches only the header portion of the data packet; and
      stores the BD in a packet reorder buffer;
   wherein the fetched BDs are read from or written to the reorder buffer in an order indicated by a sequence number of a data packet in the header information of the data packets associated with the fetched BDs; and wherein for each BD read from the reorder buffer, the payload portion of the data packet with which the BD is associated is fetched from the packet buffer.

7. The DPME of claim 6, wherein the packet reorder engine further, for each of the data packets stored in the packet buffer, stores the fetched header portion associated with the data packet in the slot of the reorder buffer in which the associated BD is stored.

8. The DPME of claim 6, wherein the payloads are not stored in the reorder buffer.

9. The DPME of claim 6, wherein the packet buffer is approximately an order of magnitude larger than the reorder buffer.

10. A method of reordering data packets stored in a packet buffer, wherein each of the data packets comprises a header portion and a payload, and wherein each of the stored data packets has associated therewith a buffer descriptor (BD) identifying a location of the data packet in the packet buffer, the method comprising:

for each of the stored data packets:
fetching the BD associated with the stored data packet and only the header portion of the stored data packet; and
storing the fetched BD associated with the stored data packet in a slot of a reorder buffer;

reading the stored BDs from the reorder buffer in an order indicated by the header portions of the stored data packets with which the BDs are associated; and for each of the stored BDs read from the reorder buffer, fetching the payload of the stored data packet with which the BD is associated from packet buffer, wherein the header portion comprises a sequence number of the data packet, and wherein the fetched BDs are stored in or read from the reorder buffer in an order indicated by the sequence number of the data packet.

11. The method of claim 10, further comprising, for each of the stored data packets, storing the fetched header portion associated with the data packet in the reorder buffer with the associated BD.

12. The method of claim 10, further comprising refraining from storing the payloads in the reorder buffer.

* * * * *